US009646087B2

United States Patent
PB et al.

(10) Patent No.: US 9,646,087 B2
(45) Date of Patent: May 9, 2017

(54) SCENE BREAK PREDICTION BASED ON CHARACTERISTICS OF PREVIOUS SCENES

(75) Inventors: Ramesh PB, Uttar Pradesh (IN); Abhinav Darbari, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 2025 days.

(21) Appl. No.: 12/104,920

(22) Filed: Apr. 17, 2008

(65) Prior Publication Data

US 2013/0194508 A1 Aug. 1, 2013

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *G06F 17/30* | (2006.01) |
| *H04N 5/14* | (2006.01) |
| *G11B 27/28* | (2006.01) |

(52) U.S. Cl.
CPC ........ *G06F 17/30784* (2013.01); *G11B 27/28* (2013.01); *H04N 5/147* (2013.01)

(58) Field of Classification Search
None
See application file for complete search history.

(56) References Cited

U.S. PATENT DOCUMENTS

| | | | | |
|---|---|---|---|---|
| 5,719,643 | A * | 2/1998 | Nakajima | 348/700 |
| 7,880,815 | B2 * | 2/2011 | Yeh et al. | 348/700 |
| 2003/0123726 | A1 * | 7/2003 | Suh | 382/170 |
| 2007/0183663 | A1 * | 8/2007 | Wang et al. | 382/173 |
| 2008/0118153 | A1 * | 5/2008 | Wu et al. | 382/190 |
| 2009/0030879 | A1 * | 1/2009 | Sharkey et al. | 707/3 |

\* cited by examiner

*Primary Examiner* — Mehrdad Dastouri
*Assistant Examiner* — Kristin Dobbs
(74) *Attorney, Agent, or Firm* — Kilpatrick Townsend & Stockton LLP

(57) ABSTRACT

Methods and apparatus provide for a Scene Detector to optimize the location of scene breaks in a set of video frames. Specifically, the Scene Detector receives a set of video frames and a corresponding content model for each video frame. As the Scene Detector identifies a scene in the set of video frames, the Scene Detector updates statistical predictors with respect to characteristics of that scene's characteristics. The Scene Detector thereby utilizes the updated statistical predictors to identify a video frame that may be the next scene break. The Scene Detector analyzes video frames with respect to the possible next scene break in order to identify the actual second scene break that occurs after the previously identified scene break.

38 Claims, 13 Drawing Sheets

FIG. 3

400-1 if |GMMMeanSceneDuration1 - currentSceneDuration| < 2*GMMStdDevSceneDuration1 then:
GMMMeanSceneDuration1 = GMMMeanSceneDuration1 + learning Rate * (currentSceneDuration - GMMMeanSceneDuration1) ;
GMMStdDevSceneDuration1 = GMMStdDevSceneDuration1 + learningRate * {(currentSceneDuration - GMMMeanSceneDuration1) - GMMStdDevSceneDuration1 }
GMMWeight1 = GMMWeight1 + LearningRateForGMMWeight ;
GMMWeight2 = GMMWeight2 - 2*LearningRateForGMMWeight;
GMMWeight3 = GMMWeight3 - 2*LearningRateForGMMWeight

400-2 if |GMMMeanSceneDuration2 - currentSceneDuration| <2* GMMStdDevSceneDuration2 then:
GMMMeanSceneDuration2 = GMMMeanSceneDuration2 + learning Rate * (currentSceneDuration - GMMMeanSceneDuration2);
GMMStdDevSceneDuration2 = GMMStdDevSceneDuration2 + learningRate * {(currentSceneDuration - GMMMeanSceneDuration2) - GMMStdDevSceneDuration2 }
GMMWeight1 = GMMWeight1 - 2*LearningRateForGMMWeight ;
GMMWeight2 = GMMWeight2 + LearningRateForGMMWeight;
GMMWeight3 = GMMWeight3 - 2*LearningRateForGMMWeight

400-3 if |GMMMeanSceneDuration3 - currentSceneDuration| < 2*GMMStdDevSceneDuration3 then:
GMMMeanSceneDuration3 = GMMMeanSceneDuration3 + learning Rate * (currentSceneDuration - GMMMeanSceneDuration3);
GMMStdDevSceneDuration3 = GMMStdDevSceneDuration3 + learningRate * {(currentSceneDuration - GMMMeanSceneDuration3) - GMMStdDevSceneDuration3 }
GMMWeight1 = GMMWeight1 - 2*LearningRateForGMMWeight ;
GMMWeight2 = GMMWeight2 - 2*LearningRateForGMMWeight;
GMMWeight3 = GMMWeight3 + LearningRateForGMMWeight

400-4

$GMM(x) = 1/(2*pi) * \acute{O} GMMWeight(i)$ raise to the power $(x - GMMMeanSceneDuration(i))* (x - GMMMeanSceneDuration(i))) / 2 * GMMStdDevSceneDuration(i) * GMMStdDevSceneDuration(i)$

SCENE BREAK PREDICTION BASED ON CHARACTERISTICS OF PREVIOUS SCENES

BACKGROUND

In conventional systems, cut detection is used to split up a film into basic scenes. Specifically, cut detection finds the positions in a video where one scene is replaced by another scene with different visual content. Each frame within a digital video can be uniquely identified by its frame index. A "shot" is a sequence of frames shot uninterruptedly by one camera. A "cut" is the blending, in some way, of one shot into another one. Cut detection further distinguishes hard cuts from soft cuts. While a hard cut is a sudden transition from one shot to another, a soft cut is a gradual transition between two shots. Cut detections thereby attempts to locates a hard cut between frame i and frame i+1, whereas a soft cut is locates soft cut from frame i to frame j. When conventional systems fails to locate a cut, the overlooked cut is called a missed hit. When conventional systems assume a position of a cut, but not cut is actually present at the assumed position, the incorrectly assumed position is called a false hit.

SUMMARY

Conventional computer systems suffer from a variety of deficiencies. For example, conventional systems for cut detection are based on inefficient algorithms. Specifically, as scenes are located, conventional systems fail to take into account characteristics of identified scenes to make accurate predictions regarding where the next scene break will most likely occur.

In addition, conventional systems do not combine identifying posterframes for scenes along with conventional cut detection. Thus, if a user desires to identify a video frame within a scene that is most representative of the scene, the user would have to initiate a separate process to identify a posterframe once the conventional cut detection process is complete.

Techniques discussed herein significantly overcome the deficiencies of conventional applications such as those discussed above as well as additional techniques also known in the prior art. As will be discussed further, certain specific embodiments herein are directed to a Scene Detector. The one or more embodiments of the Scene Detector as described herein contrast with conventional computer systems to guess where the next scene break most likely occurs based on the characteristics of previously identified scenes.

Upon identifying a video frame where the next scene break most likely occurs, the Scene Detector analyzes video frames with respect to the "possible next scene break" in order to locate the actual scene break. Thus, as the Scene Detector identifies more scenes, the Scene Detector's predictions as to possible next scene breaks becomes a function of the characteristics of all those previous scenes. Moreover, the Scene Detector's search for an actual scene break is optimized since its search is based on a video frame that has already been identified as possible next scene break.

In addition, while the Scene Detector identifies the actual scene break, the Scene Detector concurrently processes video frames to identify a posterframe for the scene. It is understood that a posterframe is a video frame from a scene that best represents the content of the scene.

For example, in one embodiment, the Scene Detector receives a set of video frames and a histogram for each video frame. Upon identifying a first scene break at the $5^{th}$ video frame in the set of video frames, the Scene Detector updates (i.e. creates, resets, initializes) statistical predictors based on characteristics of the identified first scene. The Scene Detector processes the statistical predictors to determine where the next possible scene break most likely occurs in the set of video frames. By processing the statistical predictors, the Scene Detector determines that the next scene break most likely occurs at the $10^{th}$ video frame. By executing a histogram function with histograms of the $10^{th}$ and $6^{th}$ video frames (i.e. the video frame adjacent to the first scene break), the Scene Detector determines whether the $6^{th}$ and $10^{th}$ video frames are part of the same scene or belong to different scene.

If the Scene Detector determines the histogram intersection of the $6^{th}$ and $10^{th}$ histograms is less than a learned threshold value, then the $6^{th}$ and $10^{th}$ video frames belong to the same scene. Thus, the Scene Detector knows it does not have to incur processing costs by analyzing any of the video frames between the $6^{th}$ and $10^{th}$ video frames to locate a scene break. The Scene Detector thereby modifies the learned threshold value and shifts the focus of its search to start at the $11^{th}$ video frame. The Scene Detector determines a new possible next scene break that occurs after the $11^{th}$ video frame while still using the statistical predictors based on the previously identified scene and again executes a histogram intersection of the $11^{th}$ video frame and the new possible next scene break.

However, if the Scene Detector determines the histogram intersection of the $6^{th}$ and $10^{th}$ histograms is greater than the learned threshold value, then the $6^{th}$ and $10^{th}$ video frames belong to different scenes. Thus, the Scene Detector knows that an actual scene break occurs from the $6^{th}$ video frame to the $10^{th}$ video frame. Via a binary search pattern that considers some video frames occurring from $6^{th}$ video frame to the $10^{th}$ video frame, the Scene Detector locates those two video frames from $6^{th}$ video frame to the $10^{th}$ video frame that produce the greatest histogram intersection. Upon locating the greatest histogram intersection, the Scene Detector identifies the actual scene break.

Specifically, the Scene Detector receives a set of video frames and a corresponding content model for each video frame. As the Scene Detector identifies a scene in the set of video frames, the Scene Detector updates statistical predictors with respect to that scene's scene break. The Scene Detector thereby utilizes the updated statistical predictors to identify a video frame that may be the next scene break. The Scene Detector analyzes video frames with respect to the possible next scene break in order to identify the actual second scene break that occurs after the previously identified scene break.

While the Scene Detector identifies a scene's actual scene break, the Scene Detector can concurrently identify that scene's posterframe. The Scene Detector performs a first histogram intersection with respect to a video frame adjacent to a first scene break and the video frame representing the first scene break. For each video frame the Scene Detector identified as a possible second scene break occurring up to and including the actual second scene break, the Scene Detector performs an additional histogram intersection between each possible second scene break video frame and a corresponding earlier video frame measured according to an updateable interframe distance. The Scene Detector identifies the highest positioned video frame associated with the lowest histogram intersection. The highest positioned video frame associated with the lowest histogram intersection is indicated by the Scene Detector as a posterframe of the second scene.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Scene Detector, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 3 is an example block diagram of a conditions detected by a statistical updater to update statistical predictors used by a Scene Detector to identify a possible scene break in a set of video frames according to embodiments herein.

DETAILED DESCRIPTION

Figure 1:
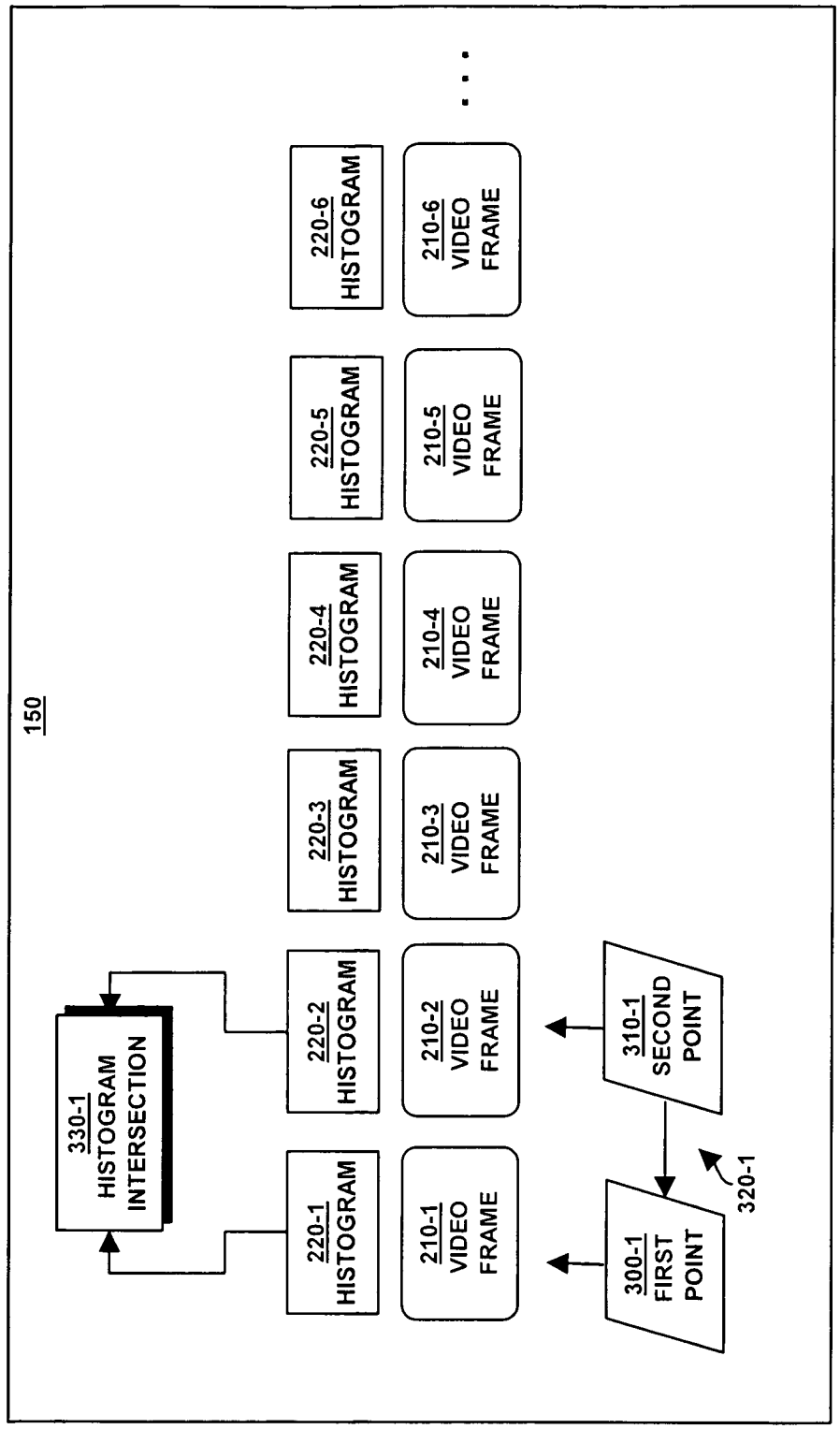
FIG. 1 is an example block diagram of a Scene Detector performing a color model intersection on two video frames according to embodiments herein.

FIG. 1 is an example block diagram of a Scene Detector 150 performing a color model intersection (e.g. histogram intersection 330) on two video frames 210-1, 210-2 according to embodiments herein.

As the Scene Detector 150 receives a set of video frames 210, the Scene Detector 150 also receives a content model for each of the video frames 210. Each content model can be, for example, a histogram 220 corresponding to a particular video frame.

The Scene Detector 150 defines an initial value for an updateable interframe distance 320-1, which defines a number of video frames between two video frames analyzed in a content model intersection (e.g. histogram intersection 330). As illustrated in FIG. 1, the initial value for the updateable interframe distance 320-1 is equal to 1. Further, the Scene Detector 150 identifies an initial video frame 210-1 of the set of video frames 210 as a first point 300-1 and identifies a second point 310-1 as a video frame 210-2 measured at the updateable interframe distance 320-1 from the initial video frame 210-1.

In order to identify the first scene break in the set of video frames 210, the Scene Detector 150 measures the histogram intersection 330-1 between the histograms 220-1, 220-2 of the first and second points 300-1, 310-2 as: histogram intersection=1−Summation[Min(Histogram 220-2−Histogram 220-1)]. The Scene Detector 150 compares the histogram intersection 330-1 to a learned threshold value to determine whether or not the video frame 210-2 at the second point 310-1 is in the same scene as the video frame 210-1 at the first point 300-1.

Upon determining the histogram intersection 330 is less than the learned threshold value, the Scene Detector 150 determines that the video frame 210-2 at the second point 310-1 belongs to the same scene as the video frame 210-1 at the first point 300-1. The Scene Detector 150 thereby modifies the learned threshold value ("threshval") according to a predefined first learning rate. For example, where the variable "a" is the predefined first learning rate, the learned threshold value can be modified according to the following formula: threshval=current value of threshval+a*(Histogram 220-1−current value of threshval).

Since the first and second points 300-1, 310-1 are part of the same scene, the Scene Detector 150 will have to update the positions of the first and second points 300-1, 310-1 in order to perform a new histogram intersection 330 on two different video frames. The Scene Detector 150 updates the first point 300-1 to reflect the position of the second point 310-1, and the second point 310-1 is updated to reflect a position of video frame measured at the updateable interframe distance from the updated first point.

With the newly updated first and second points, the Scene Detector 150 measures the histogram intersection 330 for the two video frames positioned at the updated first and second points. The Scene Detector 150 compares the histogram intersection 330 for the two video frames positioned at the updated first and second points against the modified learned threshold value. If the histogram intersection 330 for the two video frames positioned at the updated first and second points is again less than the learned threshold value, the threshold value will again be modified and the updated first and second points will be further updated in a manner described above in order to measure a new histogram intersection 330.

Figure 2:
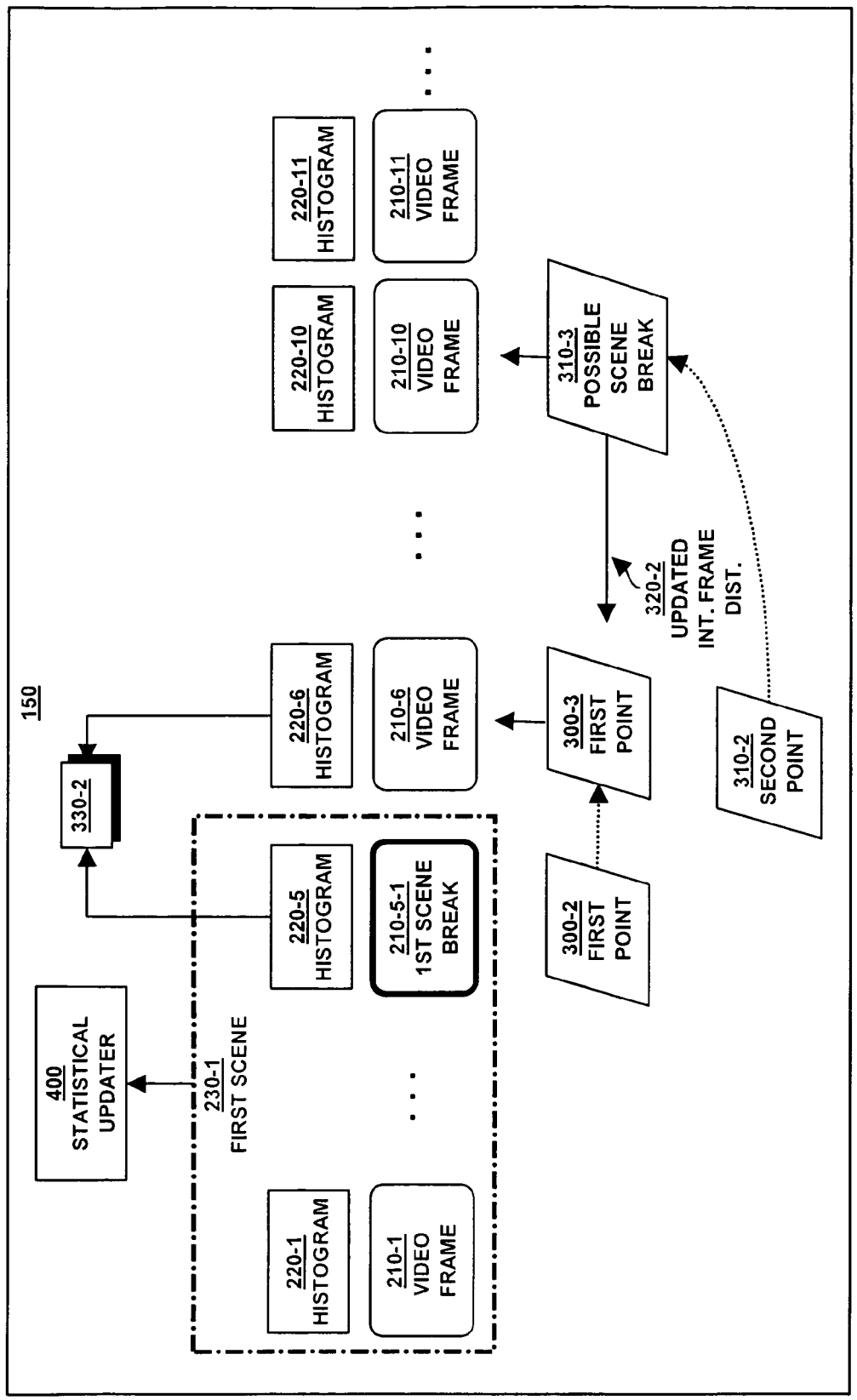
FIG. 2 is an example block diagram of a Scene Detector locating a first scene break in a set of video frames according to embodiments herein.

FIG. 2 is an example block diagram of a Scene Detector 150 locating a first scene break 210-5-1 in a set of video frames 210 according to embodiments herein.

As previously discussed with respect to FIG. 1, the Scene Detector 150 has continually updated the first and second points until the first point 300-2 reflects the position of the fifth video frame 210-5 and the second point 310-2 reflects the position of the sixth video frame 210-6.

Upon determining the histogram intersection 330-2 for the two histograms 220-5, 220-6 of the $5^{th}$ and $6^{th}$ video frames 210-5, 210-6 (i.e. 1−Summation[Min (Histogram 220-6−Histogram 220-5)] is greater than the learned threshold value, the Scene Detector 150 determines that the video frame 210-6 at the second point 310-2 belongs to a different scene than the video frame 210-5 at the first point 300-2. The actual scene break 210-5-1 for the first scene is, therefore, the $5^{th}$ video frame in the set of video frames 210.

The Scene Detector 150 processes characteristics of the first scene 230-1 at a statistical updater 400 in order to update (i.e. create, initialize, reset, modify) statistical predictors used in identifying a video frame that could be the next scene break (i.e. the possible next scene break) in the set of video frames 210.

For example, since the first scene 230-1 has a length of five frames, a "GMMMeanSceneDuration1" statistical predictor is initialized at '5', a "GMMStdDevSceneDuration1" statistical predictor is initialized at '2', and a "GMMWeight1" statistical predictor is initialized at '1'. It is understood that "GMM" stands for Gaussian Mixture Model.

The Scene Detector 150 sends the statistical predictors, which now reflect characteristics of the first scene 230-1, to the statistical updater 400 in order to identify a video frame in the set of video frames 210 that is most likely the next scene break (i.e. a possible next scene break).

FIG. 3 is an example block diagram of conditions 400-1, 400-2, 400-3 detected by a statistical updater 400 to update statistical predictors used by a Scene Detector 150 to identify a possible scene break 310-3 in a set of video frames 210 according to embodiments herein.

Using the initialized statistical predictors from FIG. 2, the Scene Detector 150 detects that a first condition 400-1 provided in the statistical updater 400 is satisfied. Thus, a second predefined learning rate is utilized, along with the statistical predictors to create new values for "GMMMeanSceneDuration1," "GMMStdDevSceneDuration1," and"GMMWeight1." As the Scene Detector 150 processes characteristics of the first scene 230-1 in the statistical updater 400, the first condition 400-1 produces two additional statistical predictors as well: "GMMWeight2" and"GMMWeight3."

Since the $6^{th}$ video frame 210-6 is adjacent to the first scene break 210-5-1 at the $5^{th}$ video frame, module 400-4 executes GMM(6-5) (i.e. GMM("a first point"−"previous scene break")) with the statistical predictors updated in the first condition 400-1. Executing GMM(1) at module 400-4 produces a value of 0.2.

It is understood that the number of conditions 400-1, 400-2, 400-3 depend on the number of gaussians. Hence, when the first scene is detected there is only one gaussian and hence only one condition 400-1.

By executing module 400-4 (e.g. GMM(1)) with the statistical predictors influenced by characteristics of the first scene 230-1, the Scene Detector 150 modifies the updateable interframe distance 230-1. For example, when executing module 400-4 produces a value that is greater than or equal to 0.5, the updateable interframe distance 230 is therefore set to 1. When executing module 400-4 produces a value that is greater than or equal to 0.25 and less than 0.5, the updateable interframe distance 230 is set to 2. When executing module 400-4 produces a value that is greater than or equal to 0.125 and less than 0.25, the updateable interframe distance 230 is set to 4. Further, when executing module 400-4 produces a value that is less than 0.125 and less than 0.25, the updateable interframe distance 230 is set to 8.

As shown in FIG. 2, with regard to characteristics of the first scene 230-1, module 400-4 in the statistical updater 400 produces a value of 0.2. The Scene Detector 150 thereby sets the updateable interframe distance 230-2 to a value of 4. The Scene Detector 150 updates the first point 300-2 to reflect the position of the video frame adjacent to the first scene break 210-5-1. The Scene Detector 150 updates the second point 310-3 to reflect the position of a video frame 210-10 measured at the updateable interframe distance from the adjacent video frame (i.e. the updated first point 300-2). The updated second point 310-3 represents a possible next scene break in the set of video frames 210.

Figure 4:
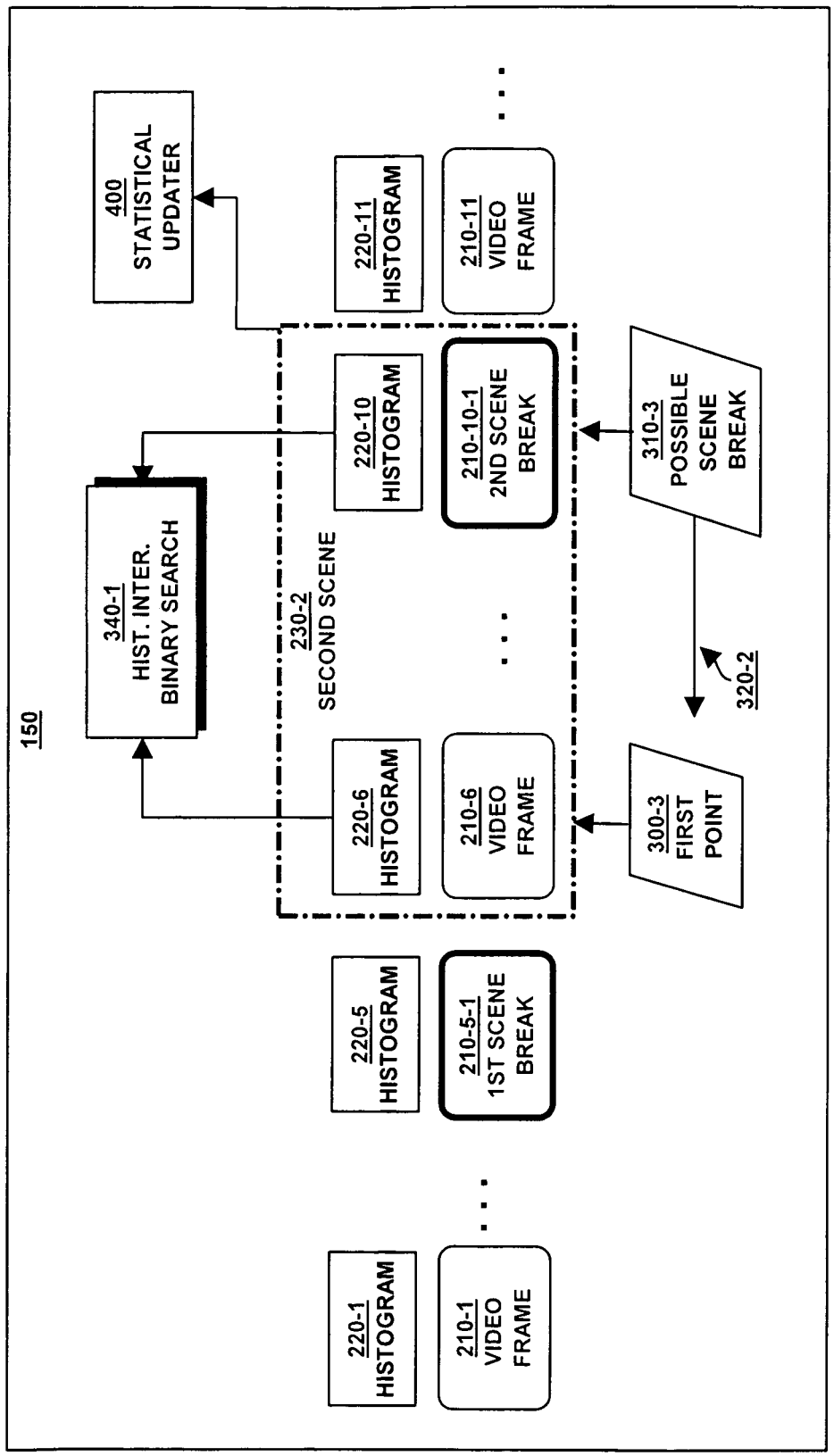
FIG. 4 is an example block diagram of a Scene Detector determining that an actual scene break occurs at a video frame identified as a possible scene break in a set of video frames according to embodiments herein.

Referring now to FIG. 4, FIG. 4 is an example block diagram of a Scene Detector 150 determining that an actual scene break 210-10-1 occurs at a video frame identified as a possible scene break 310-3 in a set of video frames 210 according to embodiments herein.

The Scene Detector 150 measures the histogram intersection between the first point 300-3 and the second point 310-3 (i.e. 1−Summation[Min (Histogram 220-10−Histogram 220-6)]. The Scene Detector 150 compares the histogram intersection between the first point 300-3 and the second point 310-3 to the modified learned threshold value to determine whether the second point 310-3 is part of the same scene as the first point 300-3.

Upon determining the histogram intersection between the first point 300-3 and the second point 310-3 is greater than the modified learned threshold value, the Scene Detector 150 determines that a video frame at the second point 310-3 in the set of video frames 210 belongs to a different scene than a video frame at the first point 300-3 in the set of video 210. Since the first point 300-3 and the second point 310-3 do not share the same scene, the Scene Detector 150 "knows" that an actual scene break must occur from the first point 300-3 to the second point 310-3. The Scene Detector 150 thereby locates the actual scene break 210-10-1 by identifying two video frames, from the first point 300-3 to the second point 310-3, that create the greatest histogram intersection occurring from the first point 300-3 to the second point 310-3

For example, the Scene Detector 150 executes a histogram intersection binary search 340-1 that can consider some video frames occurring from the first point 300-3 to the second point 310-3 (i.e. the possible scene break). As a result of the binary search 340-1, the Scene Detector 150 locates the actual scene break 210-10-1 at the tenth video frame. Thus, the Scene Detector 150 was able to correctly guess where the actual scene break occurs—thereby avoiding the processing costs of analyzing all the video frames between the first point 300-3 to the second point 310-3.

Since the second scene 230-2 is identified, the Scene Detector 150 updates the statistical predictors by sending characteristics of the second scene 230-2 to the statistical updater 400—which satisfy the first condition 400-1.

Figure 5:
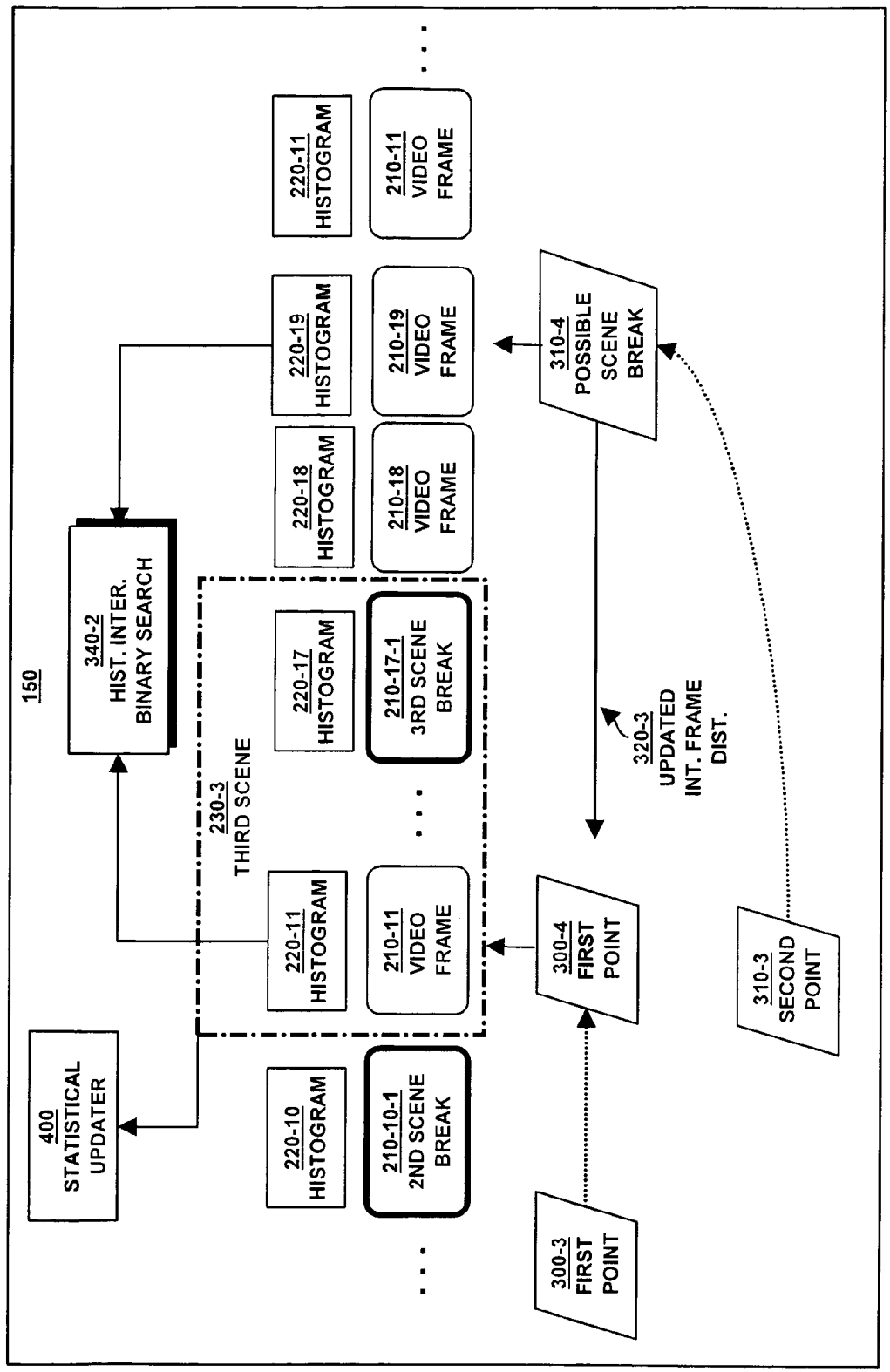
FIG. 5 is an example block diagram of a Scene Detector determining that an actual scene break precedes a video frame identified as a possible scene break in a set of video frames according to embodiments herein.

Regarding FIG. 5, FIG. 5 is an example block diagram of a Scene Detector 150 determining that an actual scene break 210-17-1 precedes a video frame 210-19 identified as a possible scene break 310-4 in a set of video frames 210 according to embodiments herein.

Upon identifying the scene break 210-10-1, the Scene Detector 150 identifies a video frame 210-11 adjacent to the scene break 210-10-1. The Scene Detector 150 updates the first point 300-3 to represent the location of the adjacent video frame 210-11. Based on the statistical predictors updated by characteristics of the second scene 230-2, module 400-4 executes GMM(11-10) to update the updateable interframe distance 230-3 to a value of 8. The Scene Detector 150 updates the second point 310-3 to reflect a possible scene break measured at the updateable interframe distance 230-2 from the adjacent video frame 210-11 (i.e. the first point 300-3).

The Scene Detector 150 measures the histogram intersection between the histogram 220-11 of the video frame 210-11 at the first point 300-4 and the histogram 220-19 of the video frame 210-19 at the second point 310-4 (i.e. 1−Summation[Min (Histogram 220-19−Histogram 220-11)].

Upon determining the histogram intersection between the first point 300-4 and the second point 310-4 is greater than the learned threshold value, the Scene Detector 150 determines that a video frame at the second point 310-4 in the set of video frames 210 belongs to a different scene than a video frame at the first point 300-4 in the set of video 210. Since the first point 300-4 and the second point 310-4 do not share the same scene, the Scene Detector 150 "knows" that an actual scene break must occur from the first point 300-4 to the second point 310-4. The Scene Detector 150 thereby locates the actual scene break 210-17-1 by identifying two video frames that create the greatest histogram intersection occurring from the first point 300-4 to the second point 310-4

For example, the Scene Detector 150 executes a histogram intersection binary search 340-2 that considers some video frames from the first point 300-4 to the second point 310-4 (i.e. the possible scene break). As a result of the binary search 340-4, the Scene Detector 150 locates the actual scene break 210-17-1 at the $17^{th}$ video frame. Even though the actual scene break 210-17-1 occurs two video frames before the possible scene break 310-4, the search costs for the actual scene break 210-17-1 were minimized by considering the video frame 210-19 reflected by the second point 310-4

Now that the third scene 230-2 is identified, the Scene Detector 150 updates the statistical predictors by sending characteristics of the third scene 230-3 to the statistical updater 400—which again satisfy the first condition 400-1.

Figure 6:
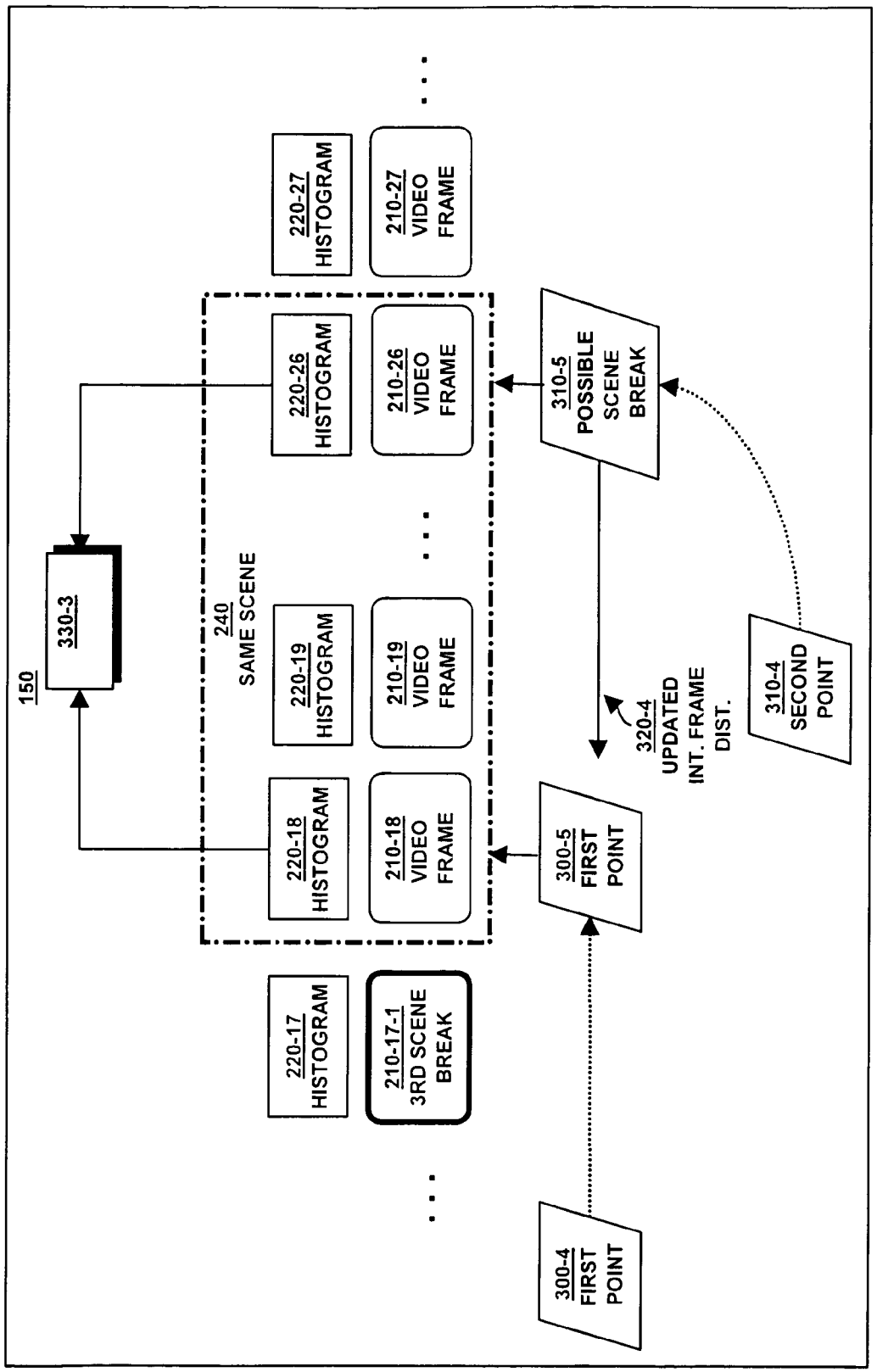
FIG. 6 is an example block diagram of a Scene Detector determining that no scene break occurs before a video frame identified as a possible scene break in a set of video frames according to embodiments herein.

Referring now to FIG. 6, FIG. 6 is an example block diagram of a Scene Detector 150 determining that no scene break occurs before a video frame 210-26 identified as a possible scene break in a set of video frames 210 according to embodiments herein.

Upon identifying the scene break 210-17-1, the Scene Detector 150 identifies a video frame 210-18 adjacent to the scene break 210-17-1. The Scene Detector 150 updates the first point 300-5 to represent the location of the adjacent video frame 210-18. Based on the statistical predictors updated by characteristics of the third scene 230-3, module 400-4 executes GMM(18-17) to set the updateable interframe distance 230-4 to a value of 8. The Scene Detector 150 updates the second point 310-5 to reflect a possible scene break measured at the updateable interframe distance 230-4 from the adjacent video frame 210-18 (i.e. the first point 300-5).

The Scene Detector 150 measures the histogram intersection between the histogram 220-18 of the video frame 210-18 at the first point 300-5 and the histogram 220-26 of the video frame 210-26 at the second point 310-5 (i.e. 1−Summation[Min (Histogram 220-26−Histogram 220-18)].

Upon determining the histogram intersection between histogram 220-18 of the video frame 210-18 at the first point 300-5 and the histogram 220-26 of the video frame 210-26 at the second point 310-5 is less than the modified learned threshold value, the Scene Detector 150 determines that the possible second scene break represented by the second point 310-5 belongs to the same scene 240 as the adjacent video frame 210-18 represented by the first point 300-5. Thus, the Scene Detector 150 does not have to incur the processing costs of analyzing the video frames 210-18 . . . 210-26 from the first point 300-5 to the second point 310-5.

Figure 7:
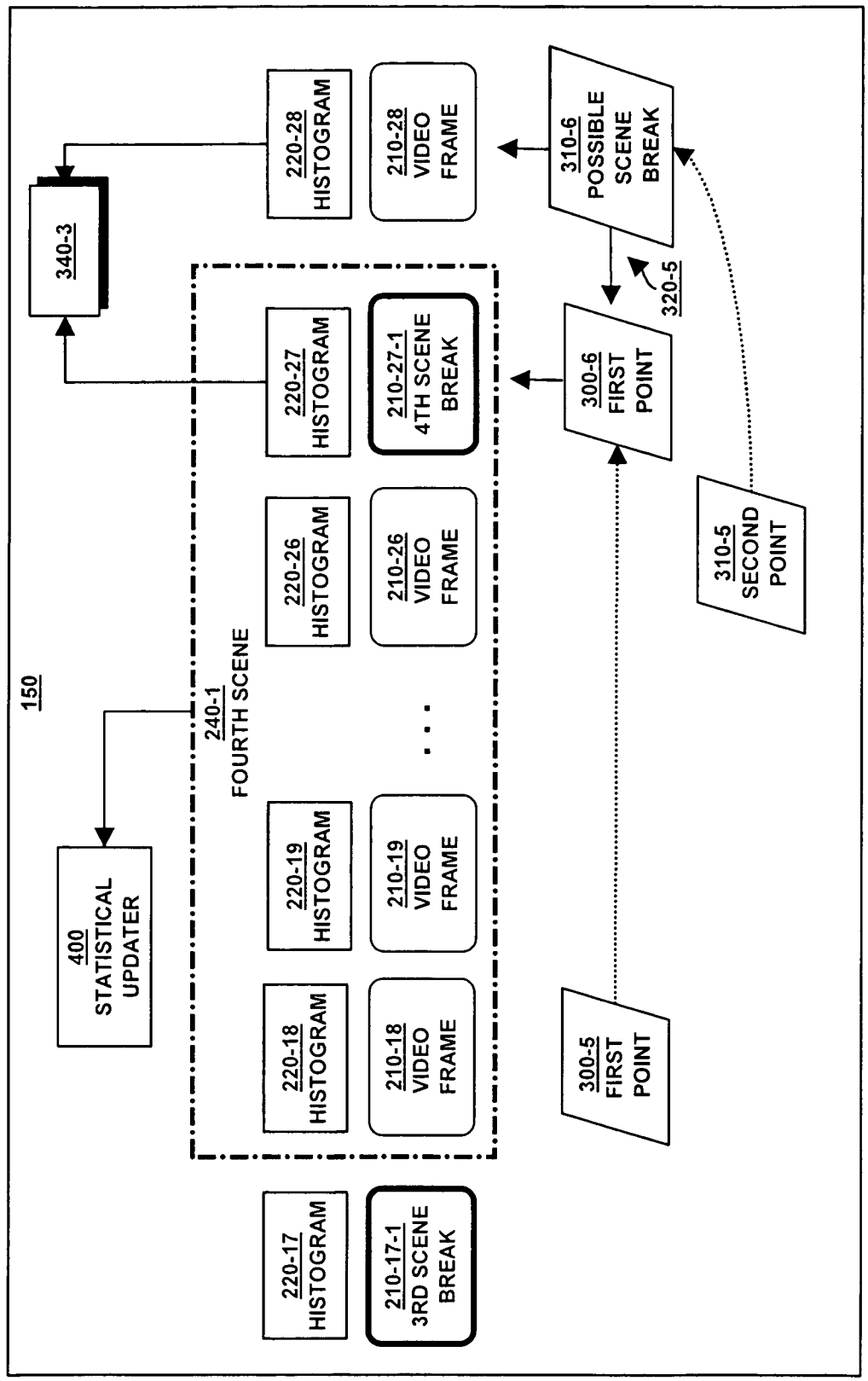
FIG. 7 is an example block diagram of a Scene Detector determining that an actual scene break occurs just after a video frame previously identified as a possible scene break in a set of video frames according to embodiments herein.

FIG. 7 is an example block diagram of a Scene Detector 150 determining that an actual scene break 210-27-1 occurs just after a video frame 210-26 previously identified as a possible scene break 310-5 in a set of video frames 210 according to embodiments herein.

Since the histogram intersection between the histogram 220-18 of the video frame 210-18 at the first point 300-5 and the histogram 220-26 of the video frame 210-26 at the second point 310-5 is less than the modified learned threshold value, the Scene Detector 150 again modifies the learned threshold value according to the predefined first learning rate. In addition, the Scene Detector 150 updates the first point 300-6 to reflect a video frame adjacent to the possible second scene break (i.e. the second point 310-6).

Even though the scene break for the fourth scene 240-1 has yet to be identified, the Scene Detector 150 updates the updateable interframe distance 230-5 since there is a new first point 300-6. In other words, the Scene Detector 150 attempts to guess a new possible scene break for the fourth scene 240-1 measured from the new first point 300-6. Still using the characteristics of the third scene 230-3, module 400-4 executes GMM(27-17) to set the updateable interframe distance 230-5 to a value of 1. The Scene Detector 150 updates the second point 310-6 to reflect a possible scene break measured at the updateable interframe distance 230-5 from the first point 300-6.

The Scene Detector 150 measures the histogram intersection between the histogram 220-27 of the video frame 210-27 at the first point 300-6 and the histogram 220-28 of the video frame 210-28 at the second point 310-6 (i.e. 1−Summation[Min (Histogram 220-28−Histogram 220-27)]. Upon determining the histogram intersection between histogram 220-27 of the video frame 210-27 at the first point 300-6 and the histogram 220-28 of the video frame 210-28 at the second point 310-6 is greater than the modified learned threshold value, the Scene Detector 150 determines that a video frame 210-28 at the second point 310-6 belongs to a different scene than a video frame 210-27-1 at the first point 300-6 in the set of video frames 210.

Since the first point 300-6 and the second point 310-6 do not share the same scene, the Scene Detector 150 "knows" that an actual scene break must occur from the first point 300-6 to the second point 310-6. The Scene Detector 150 thereby locates the actual scene break 210-27-1 by identifying two video frames, from the first point 300-6 to the second point 310-6, that create the greatest histogram intersection occurring from the first point 300-6 to the second point 310-6. For example, the Scene Detector 150 executes a histogram intersection binary search 340-3 that considers some video frames from the first point 300-6 to the second point 310-6 (i.e. the possible scene break). As a result of the binary search 340-4, the Scene Detector 150 locates the actual scene break 210-27-1 at the $27^{th}$ video frame—only one video frame after the initial possible scene break 310-5 guessed for the fourth scene 240-1.

Thus, the fourth scene 230-4 in the set of video frames 210 has a length of 10 video frames. The Scene Detector 150 sends characteristics of the fourth scene 230-4 to the statistical updater 400 to update the statistical predictors. However, characteristics of the fourth scene 230-4 fail to satisfy the first condition 400-1. The Scene Detector 150 initializes additional statistical predictors in order to process characteristics of the fourth scene 230-4 via the second condition 400-2 or the third condition 400-3.

For example, a "GMMMeanSceneDuration2" statistical predictor is initialized at '10', a "GMMStdDevSceneDuration2" statistical predictor is initialized at '2', and a "GMMWeight2" statistical predictor is initialized at '1'. The Scene Detector 150 then sends the all the statistical predictors to the statistical updater 400, which will trigger execution from the second condition 400-2.

Figure 8:
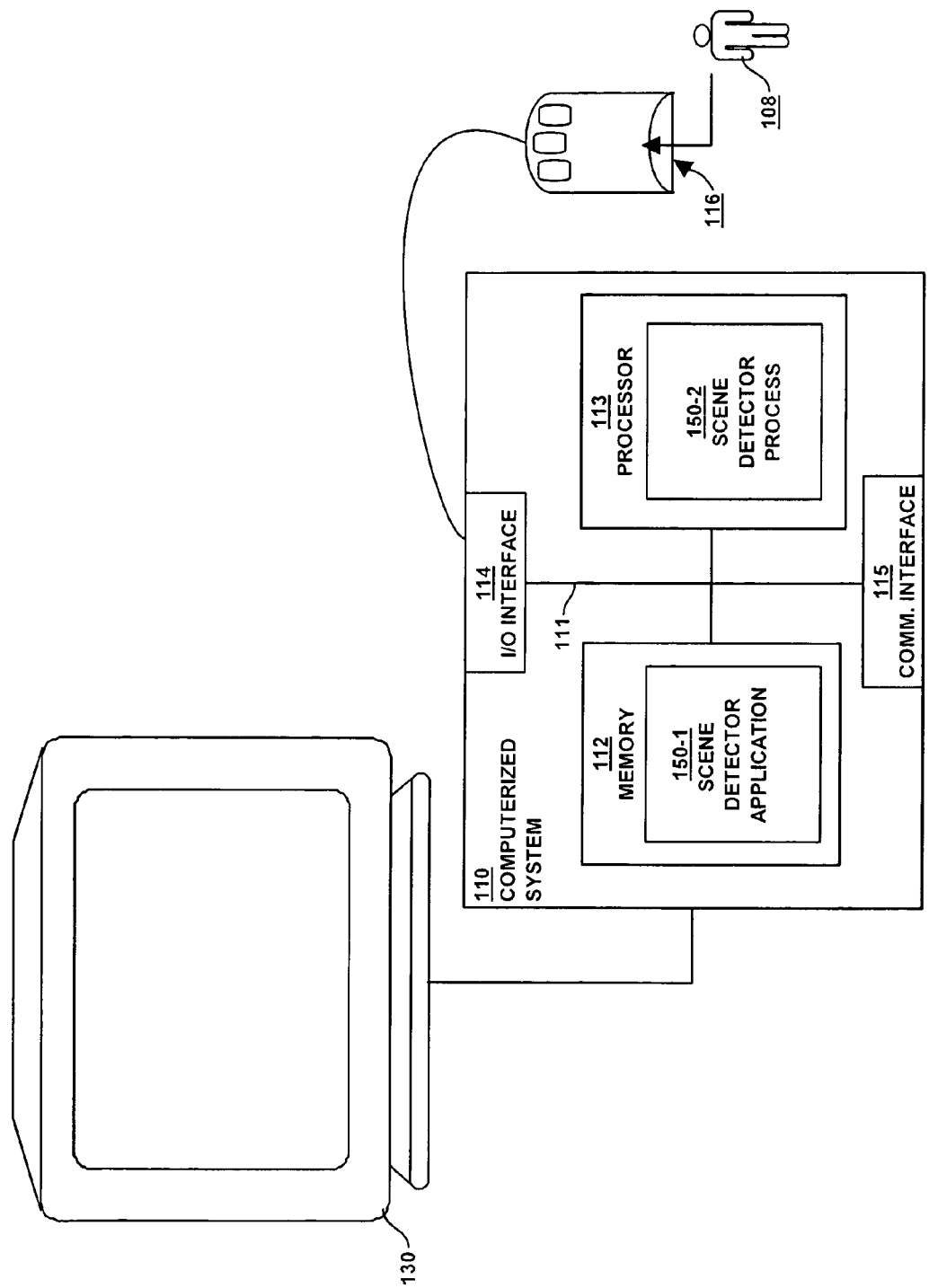
FIG. 8 is an example block diagram illustrating an architecture of a computer system that executes, runs, interprets, operates or otherwise performs a Scene Detector application and/or Scene Detector process according to embodiments herein.

FIG. 8 is an example block diagram illustrating an architecture of a computer system 110 that executes, runs, interprets, operates or otherwise performs a Scene Detector application 150-1 and/or Scene Detector process 150-2 (e.g. an executing version of a Scene Detector 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Scene Detector 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system.

Depending on the embodiment, the Scene Detector application 150-1 and/or the Scene Detector process 150-2 can be distributed and executed in multiple nodes in a computer network environment or performed locally on a single computer. The Scene Detector application 150-1 may be stored on a computer readable medium (such as a floppy disk), hard disk, electronic, magnetic, optical, or other computer readable medium. It is understood that embodiments and techniques discussed herein are well suited for other applications as well.

During operation of the computer system 110, the processor 113 accesses the memory system 112 via the interconnect 111 in order to launch, run, execute, interpret or otherwise perform the logic instructions of the Scene Detector application 150-1. Execution of the Scene Detector application 150-1 in this manner produces the Scene Detector process 150-2. In other words, the Scene Detector process 150-2 represents one or more portions or runtime instances of the Scene Detector application 150-1 (or the entire application 150-1) performing or executing within or upon the processor 113 in the computerized device 110 at runtime.

Those skilled in the art will understand that the computer system 110 may include other processes and/or software and hardware components, such as an operating system. Display 130 need not be coupled directly to computer system 110. For example, the Scene Detector application 150-1 can be executed on a remotely accessible computerized device via the communication interface 115.

Figure 9:
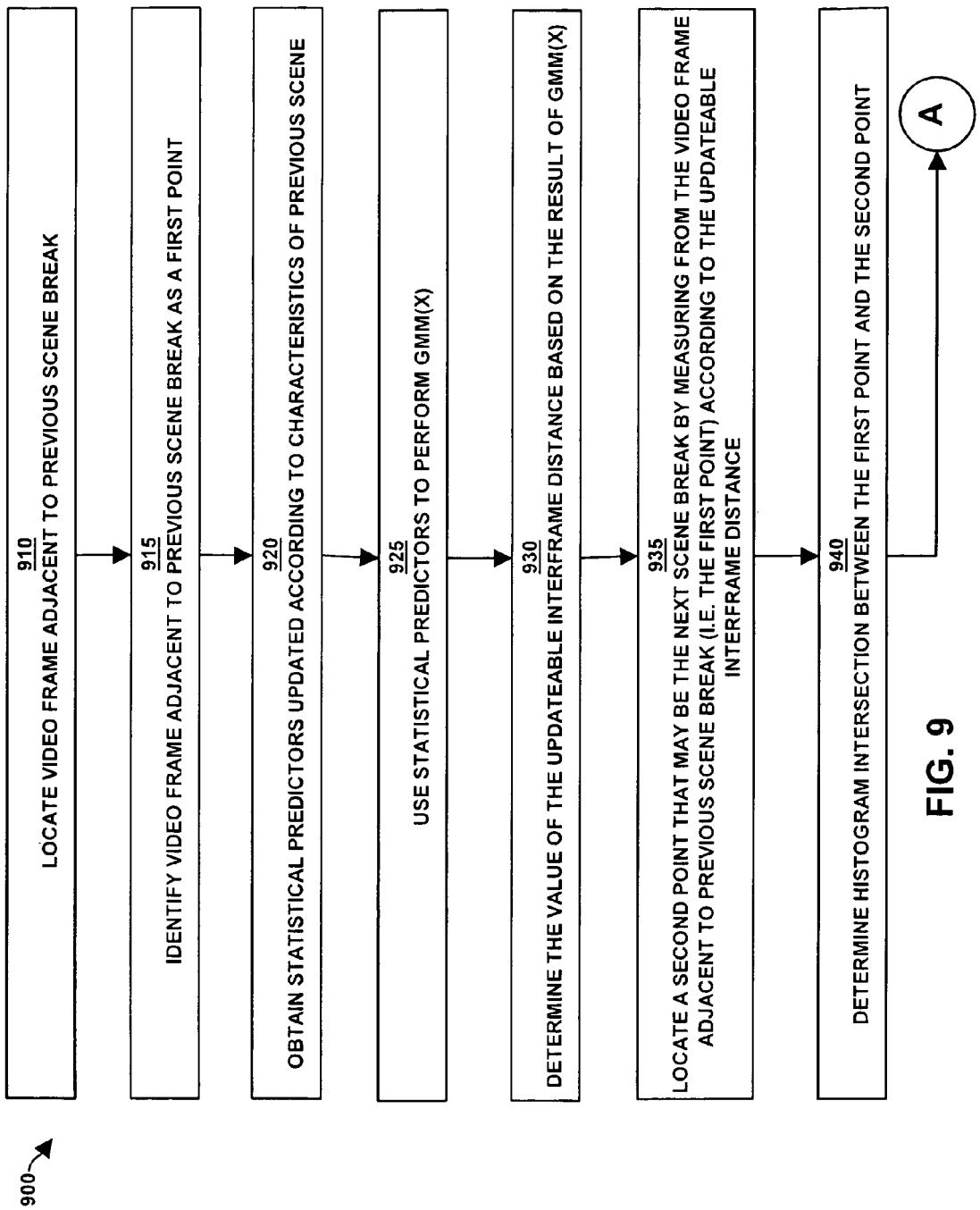
FIG. 9 is a flowchart of an example of processing steps performed by a Scene Detector to identify a possible next scene based on characteristics of a previous scene according to embodiments herein.

FIG. 9 through FIG. 1200 illustrate various embodiment of the Scene Detector 150. The rectangular elements in flowcharts 900, 1000, 1100 and 1200 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 900, 1000, 1100 and 1200 do not necessarily depict the syntax of any particular programming language. Rather, flowcharts 900, 1000, 1100 and 1200 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

FIG. 9 is a flowchart 900 of an example of processing steps performed by a Scene Detector to identify a possible next scene based on characteristics of a previous scene according to embodiments herein.

At step 910, the Scene Detector 150 locates a video frame 210-11 adjacent to a previous scene break 210-10-1.

At step 915, the Scene Detector 150 identifies the video frame 210-11 adjacent to a previous scene break 210-10-1 as a first point 300-4.

At step 920, the Scene Detector 150 obtains statistical predictors updated according to characteristics of a previous scene 230-2.

At step 925, the Scene Detector 150 uses the statistical predictors to perform GMM(x) in module 400-4.

At step 930, the Scene Detector 150 determines the value of the updateable interframe distance 320-3 based on the result of GMM(x).

At step 935, the Scene Detector 150 locates the video frame 210-19 measured at the updateable interframe distance 320-3 from the video frame 210-11 adjacent to the previous scene break 210-10-1. The second point 310-3 is updated to reflect the position of the video frame 210-19 is identified as a second point 310-4

At step 940, the Scene Detector 150 determines the histogram intersection between the first point 300-4 and the updated second point 310-4.

Figure 10:
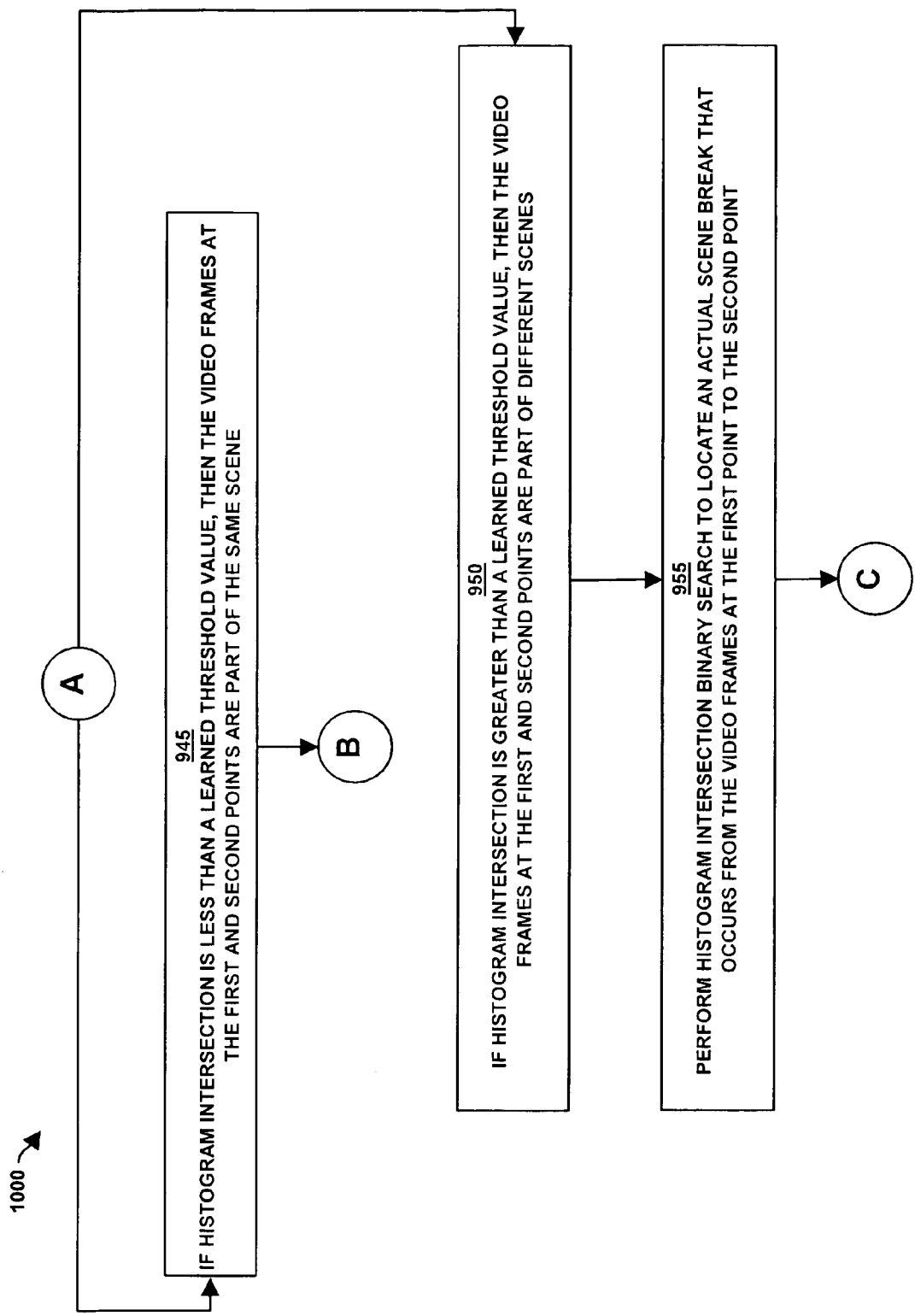
FIG. 10 is a flowchart of an example of processing steps performed by a Scene Detector to compare a histogram intersection against a learned threshold value according to embodiments herein.

Turning now to FIG. 10, FIG. 10 is a flowchart 1000 of an example of processing steps performed by a Scene Detector 150 to compare a histogram intersection against a learned threshold value according to embodiments herein.

At step 945, if the histogram intersection between the first point 300-5 and the and a second point 310-5 is less than a learned threshold value, then the video frames 210-18, 210-26 are part of the same scene 240, as illustrated in FIG. 6.

In the alternative, at step 950, if the histogram intersection between the first point 300-4 and the and a second point 310-4 is greater than the learned threshold value, then the video frames 210-11, 210-19 are each part of different scenes. Thus, there must be a video frame from the first point 300-4 to the second point 310-4 that is the actual scene break.

At step 955, the Scene Detector 150 performs a histogram intersection binary search 340-2 to locate the actual scene break 210-17-1 that occurs from the video frames 210-11 ... 210-19 at the first point 300-4 to the second point 310-4.

Figure 11:
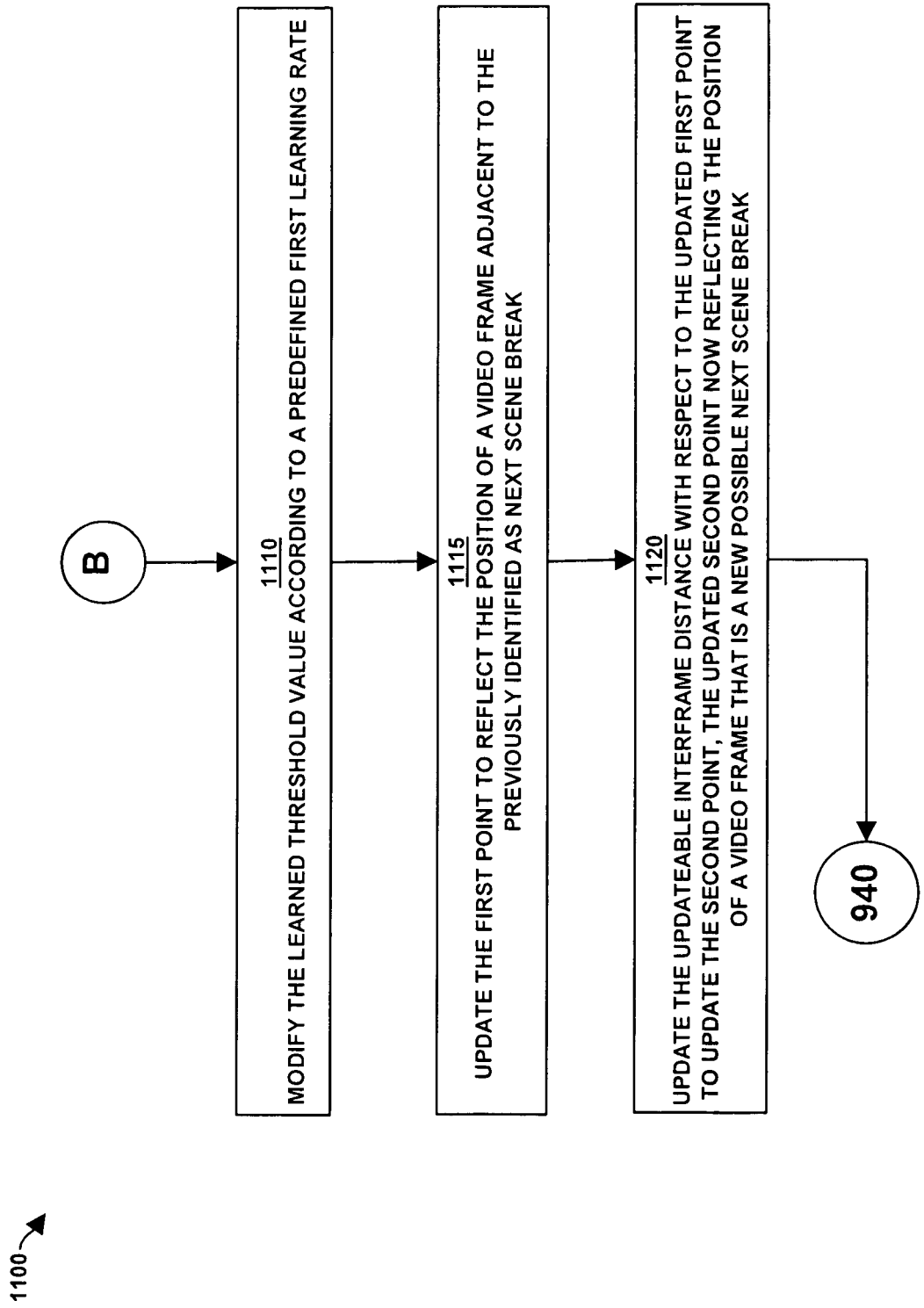
FIG. 11 is a flowchart of an example of processing steps performed by a Scene Detector to update a first point and a second point when video frames reflected by the first and second point are found to be part of the same scene according to embodiments herein.

FIG. 11 is a flowchart 1100 of an example of processing steps performed by a Scene Detector 150 to update a first point 300-5 and a second point 310-5 when video frames 210-18, 210-26 reflected by the first and second point 300-5, 310-5 are found to be part of the same scene 240 according to embodiments herein.

At step 1110, the Scene Detector 150 modifies the learned threshold value according to a predefined first learning rate.

At step 1115, the Scene Detector 150 updates the first point 300-5 to reflect the position of a video frame 210-27-1 adjacent to a video frame 210-26 previously identified as a next scene break (i.e. a possible next scene break).

At step 1120, the Scene Detector 150 updates the updateable interframe distance 320-5 with respect to the updated first point 300-6 to update the second point 310-5. The updated second point 310-6 now reflects the position of a video frame 210-28 that is a new possible next scene break. For example, as in FIG. 7, the updated first point 300-6 reflects the position of the 27$^{th}$ video frame and the previous scene break 210-17-1 occurs at the 17$^{th}$ video frame. Thus, the Scene Detector 150 executes module 400-4 with GMM (27-17)=0.6, which updates the updateable interframe distance 310-6 to a value of 1.

Figure 12:
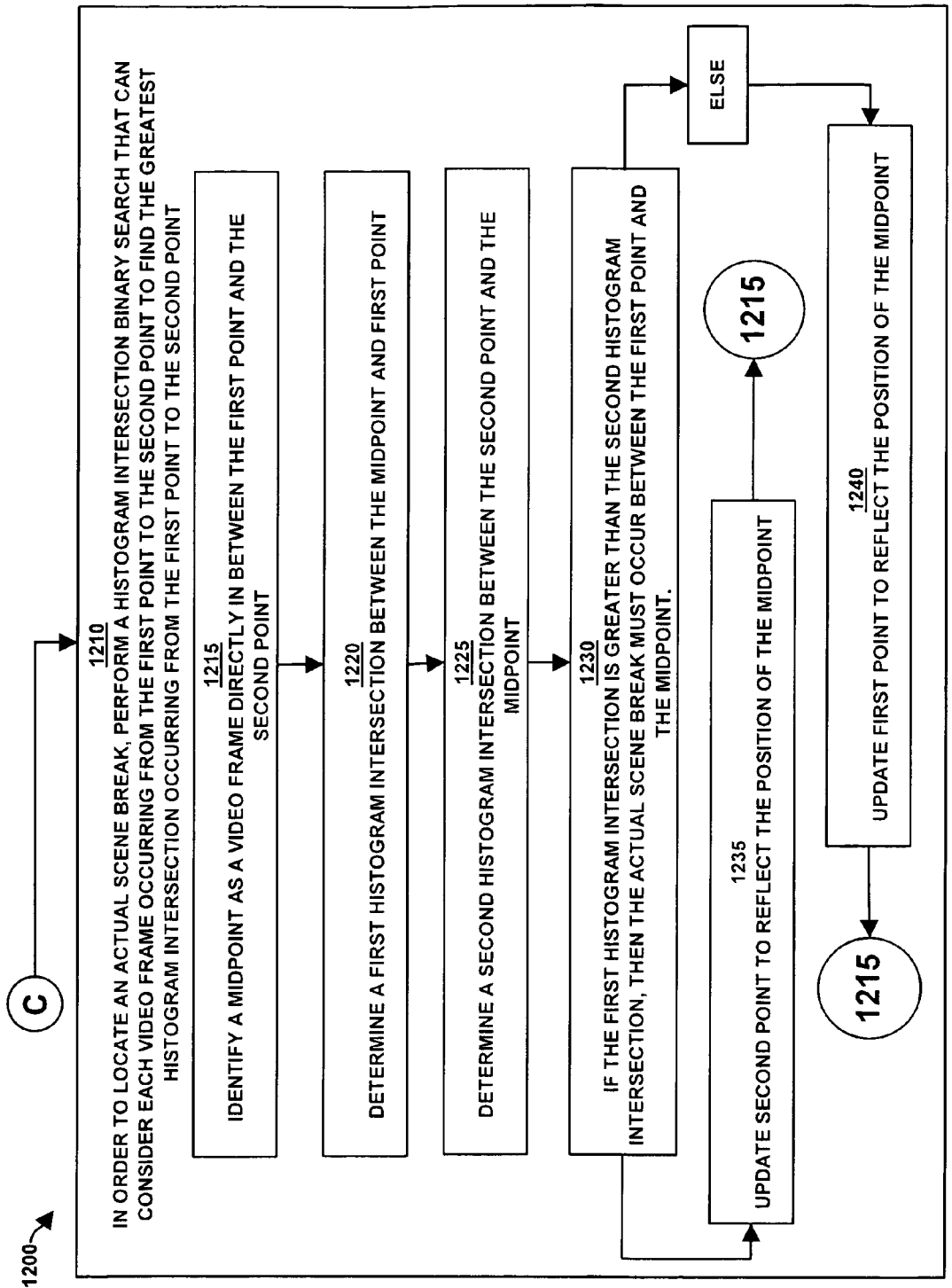
FIG. 12 is a flowchart of an example of processing steps performed by a Scene Detector to perform a histogram intersection binary search in order to locate an actual scene break occurring between a first and second point according to embodiments herein.

FIG. 12 is a flowchart 1200 of an example of processing steps performed by a Scene Detector 150 to perform a histogram intersection binary search 340-2 in order to locate an actual scene break 210-17-1 occurring between a first and second point 300-4, 31-4 according to embodiments herein.

At step 1210, in order to locate the actual scene break 210-17-1, the Scene Detector 150 performs a histogram intersection binary search 340-2 that can consider some video frames occurring from the first point 300-4 to the second point 310-4 in order to find the largest histogram intersection occurring from the first point 300-4 to the second point 310-4.

To perform the histogram intersection binary search 340-2, at step 1215, the Scene Detector 150 identifies a midpoint as a video frame directly in between the first point 300-4 and the second point 310-4. For example, when the first point 300-4 reflects the 11$^{th}$ video frame 210-11 and the second point 310-4 reflects the 19$^{th}$ video frame 210-19, the midpoint reflects the position of the 15$^{th}$ video frame.

At step 1220, the Scene Detector 150 determines a first histogram intersection between the midpoint and first point 300-4.

At step 1225, the Scene Detector 150 determines a second histogram intersection between the second point 310-4 and the midpoint.

At step 1230, if first histogram intersection is greater than the second histogram intersection, then the Scene Detector 150 "knows" that the actual scene break must occur between the first point 300-4 and the midpoint. Then, at step 1235, the Scene Detector 150 updates second point 310-4 to reflect the position of the midpoint. Thus, the first point 300-4 remains at the 11$^{th}$ video frame 210-11, and the updated second point reflects the position of the 15$^{th}$ video frame. The Scene Detector 150 returns to step 1215 with the first point 300-4 at the 11$^{th}$ video frame 210-11, and the updated second point reflecting the position of the 15$^{th}$ video frame (i.e. the previously determined midpoint).

In the alternative, upon determining that the second histogram intersection is greater than the first histogram intersection, then the actual scene break 210-17-1 must occur between the midpoint (i.e. the 15$^{th}$ video frame) and the second point 310-4. Then, at step 1240, the Scene Detector 150 updates first point 300-4 to reflect the position of the midpoint. Thus, the second point 310-4 remains at the 19th video frame 210-19, and the updated first point reflects the position of the 15th video frame. The Scene Detector 150 returns to step 1215 with the first point at the 15th video frame 210-11, and the second point 310-4.

Figure 13:
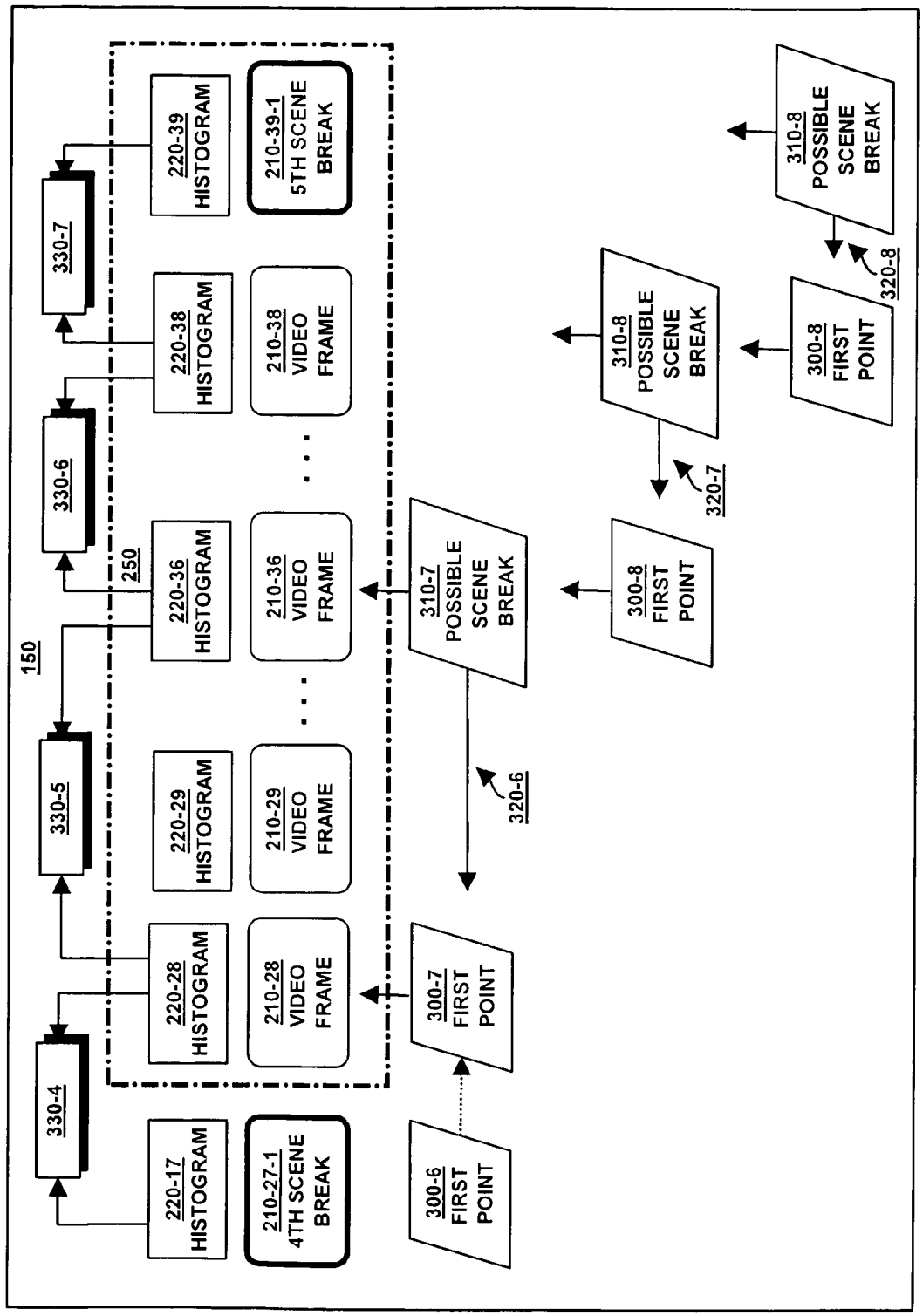
FIG. 13 is an example block diagram of a Scene Detector determining a posterframe for a scene while identifying that scene's actual scene break according to embodiments herein.

Turning now to FIG. 13, FIG. 13 is an example block diagram of a Scene Detector 150 determining a posterframe for a scene 250 while identifying that scene's actual scene break 210-39-1 according to embodiments herein.

Upon identifying the scene break 210-27-1, the Scene Detector 150 identifies a video frame 210-28 adjacent to the scene break 210-27-1. The Scene Detector 150 updates the first point 300-7 to represent the location of the adjacent video frame 210-28. Based on the statistical predictors updated by characteristics of the fourth scene 240-1, module 400-4 executes GMM(28-27) to set the updateable interframe distance 230-6 to a value of 8. The Scene Detector 150 updates the second point 310-7 to reflect a possible scene break measured at the updateable interframe distance 230-6 from the adjacent video frame 210-28 (i.e. the first point 300-7).

The Scene Detector 150 measures the histogram intersection 330-5 between the histogram 220-28 of the video frame 210-28 at the first point 300-7 and the histogram 220-36 of the video frame 210-36 at the second point 310-7 (i.e. 1−Summation[Min (Histogram 220-36−Histogram 220-28)].

Upon determining the histogram intersection 330-5 between the histogram 220-28 of the video frame 210-28 at the first point 300-7 and the histogram 220-36 of the video frame 210-36 at the second point 310-7 is less than the modified learned threshold value, the Scene Detector 150 determines that the possible second scene break represented by the second point 310-7 belongs to the same scene as the adjacent video frame 210-28 represented by the first point 300-7.

The Scene Detector 150 repeats the process described above to created updated first points 300-8, 300-9, new possible second scene breaks 310-8, 310-9 (i.e. updated second points) an updated updateable interframe distances 320-7, 320-8 until an actual scene break 210-39-1 for the fifth scene 250 is identified.

During the iterative process directed to identifying the fifth scene 250, the Scene Detector 150 performs a histogram intersection 330-4, 330-5, 330-6, 330-7 involving the adjacent video frame 210-28 and each video frame 210-36, 210-38, 210-39, respectively. For example, the Scene Detector 150 performs a histogram intersection 330-5 between the 36th video frame 210-36 and the 28th video frame 210-28 (i.e. 1−Summation[Min (Histogram 220-36−Histogram 220-28)].

The Scene Detector 150 identifies which histogram intersection 330-4, 330-5, 330-6, 330-7 returns the lowest value. The video frame associated with the histogram intersection 330 that returns the lowest value is the video frame that is most representative of the content of the fifth scene's 250. For example, if a histogram intersection 330-5 between the 36th video frame 210-36 and the 28th video frame 210-28 returns the lowest value, then the 36th video frame 210-36 is the posterframe for fifth scene 250. Note again that techniques herein are well suited for a Scene Detector 150 to guess where the next scene break will most likely occur based on the characteristics of previously identified scenes. Upon identifying a video frame where the next scene break most likely occurs, the Scene Detector analyzes video frames with respect to the "possible next scene break" to locate the actual scene break. Thus, the Scene Detector's search for an actual scene break is optimized since the search is based on a video frame that has already been identified as possible next scene break.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   receiving, by at least one processor, a set of video frames; and
   in response to identifying a first video frame in the set of video frames, the first video frame representing a first scene break:
      updating, by at least one processor, at least one statistical predictor based at least in part on the first video frame;
      determining, by at least one processor, a second video frame in the set of video frames based at least in part on the at least one statistical predictor, the second video frame representing a possible second scene break, the second video frame occurring a plurality of frames after the first video frame in the set of video frames, the second video frame being determined without analyzing a next video frame adjacent to the first video frame in the set of video frames; and
      analyzing, by at least one processor, at least the second video frame to identify a third video frame in the set of video frames, the third video frame representing an actual second scene break occurring after the first video frame in the set of video frames.

2. The method of claim 1, wherein:
   receiving the set of video frames comprises:
      receiving a content model for each of the video frames;
      defining an initial value for an updateable interframe distance, the updateable interframe distance comprising a number of video frames between two video frames analyzed in a content model intersection;
      identifying an initial video frame of the set of video frames as a first point in the set of video frames;
      identifying a second point in the set of video frames as a video frame measured at the updateable interframe distance from the initial video frame; and
      identifying the video frame representing the first scene break in the set of video frames comprises:
         measuring a content model intersection between a content model of the first point and a content model of the second point, and
         comparing the content model intersection to a learned threshold value to determine whether the second point is part of a same scene as the first point.

3. The method of claim 2, further comprising:
   upon determining the content model intersection is less than the learned threshold value:
      determining that the second point belongs to the same scene as the first point;
      modifying the learned threshold value according to a predefined first learning rate;
      updating the first point to reflect a video frame currently indicated by the second point;
      updating the second point to reflect a video frame measured at the updateable interframe distance from the updated first point; and
      repeating the steps of measuring and comparing until the content model intersection between the content model of the first point and the content model of the second point is greater than the learned threshold value.

4. The method of claim 3, further comprising:
   upon determining the content model intersection is greater than the learned threshold value:
      determining that a video frame at the second point in the set of video frames belongs to a different scene than a video frame at the first point in the set of video;
      locating an actual scene break by identifying two video frames that create a greatest content model intersection occurring in between the first point and the second point; and
   according to a predefined second learning rate, updating the at least one statistical predictor based on at least one characteristic of a scene ending at the actual scene break.

5. The method of claim 1, wherein
   upon identifying the video frame representing a first scene break in the set of video frames comprises identifying an adjacent video frame as a video frame adjacent to the first scene break; and
   determining the possible second scene break based on the at least one updated statistical predictor comprises:
      utilizing the at least one statistical predictor to update an updateable interframe distance with respect to the first scene break and the adjacent video frame; and
      identifying the possible second scene break as a video frame measured at the updateable interframe distance from the adjacent video frame.

6. The method of claim 5, wherein analyzing the at least one video frame with respect to the possible second scene break to identify the actual second scene break comprises:
   identifying the adjacent video frame as a first point in the set of video frames;
   identifying the possible second scene break as a second point in the set of video frames;
   measuring a content model intersection between a content model of the first point and a content model of the second point, and
   comparing the content model intersection to a learned threshold value to determine whether the second point is part of a same scene as the first point.

7. The method of claim 6, further comprising:
upon determining the content model intersection is less than the learned threshold value:
determining that the possible second scene break represented by the second point belongs to a same scene as the adjacent video frame represented by the first point;
modifying the learned threshold value according to a predefined first learning rate; and
updating the first point to reflect a video frame adjacent to the possible second scene break.

8. The method of claim 7, further comprising:
utilizing the at least one statistical predictor to update the updateable interframe distance with respect to the first scene and first point reflecting the video frame adjacent to the possible second scene break;
updating the second point to reflect a video frame measured at the updateable interframe distance from the first point reflecting the video frame adjacent to the possible second scene break, the second point reflecting a video frame as a new possible second scene break; and
repeating the steps of measuring and comparing until the content model intersection between the content model of the first point and the content model of the second point is greater than the learned threshold value.

9. The method of claim 6, further comprising:
upon determining the content model intersection is greater than the learned threshold value:
determining that a video frame at the second point in the set of video frames belongs to a different scene than a video frame at the first point in the set of video;
locating an actual scene break by identifying two video frames that create a greatest content model intersection occurring in between the first point and the second point; and
according to a predefined second learning rate, updating the at least one statistical predictor based on at least one characteristic of a scene ending at the actual scene break.

10. The method as in claim 1, wherein receiving the set of video frames comprises:
receiving a content model for each of the video frames, each content model comprising a histogram for a particular video frame in the set of video frames; and
determining a color model intersection based on a difference of any two histograms corresponding to any two video frames separated according to updateable interframe distance, the color model intersection comprising a histogram intersection.

11. The method of claim 1, wherein receiving the set of video frames comprises receiving a histogram for each video frame in the set of video frames; and
analyzing the at least one video frame with respect to the possible second scene break to identify the actual second scene break occurring after the first scene break comprises identifying a representative video frame of content of a second scene.

12. The method of claim 11, wherein identifying the representative video frame of the content of the second scene comprises:
performing a first histogram intersection with respect to a video frame adjacent to the first scene break and the video frame representing the first scene break; and
for each video frame of the analyzed at least one video frame:
performing an additional histogram intersection between that video frame and an earlier video frame measured according to an updateable interframe distance;
identifying a lowest histogram intersection from the first histogram intersection and each additional histogram intersection;
identifying a highest positioned video frame associated with the lowest histogram intersection;
indicating the highest positioned video frame associated with the lowest histogram intersection as a posterframe of the second scene, the posterframe comprising the representative video frame of the content of the second scene.

13. The method of claim 1, further comprising:
storing data to indicate the actual second scene break;
storing data to indicate a frame occurring in the first scene as a first posterframe for the first scene;
storing data to indicate a frame occurring in the second scene as a second posterframe for the second scene;
displaying the first posterframe and a second posterframe;
allowing for playback of the first scene upon detecting selection of the first posterframe; and
allowing for playback of the second scene upon detecting selection of the second posterframe.

14. A non-transitory computer readable medium comprising executable instructions encoded thereon operable on a computerized device to perform processing comprising:
instructions for receiving a set of video frames; and
instructions for in response to identifying a first video frame in the set of video frames, the first video frame representing a first scene break:
instructions for updating at least one statistical predictor based at least in part on the first video frame;
instructions for determining a second video frame in the set of video frames based at least in part on the at least one statistical predictor, the second video frame representing a possible second scene break, the second video frame occurring a plurality of frames after the first video frame in the set of video frames, the second video frame being determined without analyzing a next video frame adjacent to the first video frame in the set of video frames; and
instructions for analyzing at least the second video frame to identify a third video frame in the set of video frames, the third video frame representing an actual second scene break occurring after the first video frame in the set of video frames.

15. The non-transitory computer readable medium of claim 14, wherein the instructions for receiving the set of video frames comprises:
instructions for receiving a content model for each of the video frames;
instructions for defining an initial value for an updateable interframe distance, the updateable interframe distance comprising a number of video frames between two video frames analyzed in a content model intersection;
instructions for identifying an initial video frame of the set of video frames as a first point in the set of video frames;
instructions for identifying a second point in the set of video frames as a video frame measured at the updateable interframe distance from the initial video frame; and
wherein the instructions for identifying the video frame representing the first scene break in the set of video frames comprises:

instructions for measuring a content model intersection between a content model of the first point and a content model of the second point, and instructions for comparing the content model intersection to a learned threshold value to determine whether the second point is part of a same scene as the first point.

16. The non-transitory computer readable medium of claim 15, further comprising:
   upon determining the content model intersection is less than the learned threshold value:
      instructions for determining that the second point belongs to the same scene as the first point;
      instructions for modifying the learned threshold value according to a predefined first learning rate;
      instructions for updating the first point to reflect a video frame currently indicated by the second point;
      instructions for updating the second point to reflect a video frame measured at the updateable interframe distance from the updated first point; and
      instructions for repeating the instructions of measuring and comparing until the content model intersection between the content model of the first point and the content model of the second point is greater than the learned threshold value.

17. The non-transitory computer readable medium of claim 16, further comprising:
   upon determining the content model intersection is greater than the learned threshold value:
      instructions for determining that a video frame at the second point in the set of video frames belongs to a different scene than a video frame at the first point in the set of video;
      instructions for locating an actual scene break by identifying two video frames that create a greatest content model intersection occurring in between the first point and the second point; and
      instructions for according to a predefined second learning rate, updating the at least one statistical predictor based on at least one characteristic of a scene ending at the actual scene break.

18. The non-transitory computer readable medium of claim 14, further comprising:
   upon identifying the video frame representing a first scene break in the set of video frames:
      instructions for identifying an adjacent video frame as a video frame adjacent to the first scene break; and
      wherein the instructions for determining the possible second scene break based on the at least one updated statistical predictor comprises:
         instructions for utilizing the at least one statistical predictor to update an updateable interframe distance with respect to the first scene break and the adjacent video frame; and
         instructions for identifying the possible second scene break as a video frame measured at the updateable interframe distance from the adjacent video frame.

19. The non-transitory computer readable medium of claim 18, wherein the instructions for analyzing at least one video frame with respect to the possible second scene break to identify the actual second scene break comprises:
   instructions for identifying the adjacent video frame as a first point in the set of video frames;
   instructions for identifying the possible second scene break as a second point in the set of video frames;
   instructions for measuring a content model intersection between a content model of the first point and a content model of the second point, and
   instructions for comparing the content model intersection to a learned threshold value to determine whether the second point is part of a same scene as the first point.

20. The non-transitory computer readable medium of claim 19, further comprising:
   upon determining the content model intersection is less than the learned threshold value:
      instructions for determining that the possible second scene break represented by the second point belongs to a same scene as the adjacent video frame represented by the first point;
      instructions for modifying the learned threshold value according to a predefined first learning rate; and
      instructions for updating the first point to reflect a video frame adjacent to the possible second scene break.

21. The non-transitory computer readable medium of claim 20, further comprising:
   instructions for utilizing the at least one statistical predictor to update the updateable interframe distance with respect to the first scene and first point reflecting the video frame adjacent to the possible second scene break;
   instructions for updating the second point to reflect a video frame measured at the updateable interframe distance from the first point reflecting the video frame adjacent to the possible second scene break, the second point reflecting a video frame as a new possible second scene break; and
   instructions for repeating the instructions of measuring and comparing until the content model intersection between the content model of the first point and the content model of the second point is greater than the learned threshold value.

22. The non-transitory computer readable medium of claim 19, further comprising:
   upon determining the content model intersection is greater than the learned threshold value:
      instructions for determining that a video frame at the second point in the set of video frames belongs to a different scene than a video frame at the first point in the set of video;
      instructions for locating an actual scene break by identifying two video frames that create a greatest content model intersection occurring in between the first point and the second point; and
      instructions for according to a predefined second learning rate, updating the at least one statistical predictor based on at least one characteristic of a scene ending at the actual scene break.

23. The non-transitory computer readable medium of claim 14, wherein the instructions for receiving the set of video frames comprises:
   instructions for receiving a content model for each of the video frames, each content model comprising a histogram for a particular video frame in the set of video frames; and
   instructions for determining a color model intersection based on a difference of any two histograms corresponding to any two video frames separated according to updateable interframe distance, the color model intersection comprising a histogram intersection.

24. The non-transitory computer readable medium of claim 14, further comprising:

instructions for storing data to indicate the actual second scene break;
instructions for storing data to indicate a frame occurring in the first scene as a first posterframe for the first scene;
instructions for storing data to indicate a frame occurring in the second scene as a second posterframe for the second scene;
instructions for displaying the first posterframe and a second posterframe;
instructions for, allowing for playback of the first scene upon detecting selection of the first posterframe; and
instructions for allowing for playback of the second scene upon detecting selection of the second posterframe.

25. A computer system comprising:
a processor;
a memory unit that stores instructions associated with an application executed by the processor; and
an interconnect coupling the processor and the memory unit, enabling the computer system to execute the application and perform operations of:
receiving a set of video frames; and
in response to identifying a first video frame in the set of video frames, the first video frame representing a first scene break:
updating at least one statistical predictor based at least in part on the first video frame;
determining a second video frame in the set of video frames based at least in part on the at least one statistical predictor, the second video frame representing a possible second scene break, the second video frame occurring a plurality of frames after the first video frame in the set of video frames, the second video frame being determined without analyzing a next video frame adjacent to the first video frame in the set of video frames; and
analyzing at least the second video frame to identify a third video frame in the set of video frames, the third video frame representing an actual second scene break occurring after the first video frame in the set of video frames.

26. The computer system of claim 25, wherein:
receiving the set of video frames comprises receiving a histogram for each video frame in the set of video frames; and
analyzing the at least one video frame with respect to the possible second scene break to identify the actual second scene break occurring after the first scene break comprises identifying a representative video frame of content of a second scene.

27. The computer system of claim 25, further comprising:
storing data to indicate the actual second scene break;
storing data to indicate a frame occurring in the first scene as a first posterframe for the first scene;
storing data to indicate a frame occurring in the second scene as a second posterframe for the second scene;
displaying the first posterframe and a second posterframe;
allowing for playback of the first scene upon detecting selection of the first posterframe; and
allowing for playback of the second scene upon detecting selection of the second posterframe.

28. The method of claim 2 wherein the at least one updated statistical predictor comprises at least one Gaussian Mixture Model mean scene duration.

29. The method of claim 2 wherein the at least one updated statistical predictor comprises at least one Gaussian Mixture Model standard deviation scene duration.

30. The method of claim 2 further comprising:
updating the updateable interframe distance based on the at least one updated statistical predictor.

31. The method of claim 30 wherein updating the updateable interframe distance based on the at least one updated statistical predictor comprises:
calculating a value based on a Gaussian Mixture Model mean scene duration, a Gaussian Mixture Model standard deviation scene duration, and a Gaussian Mixture Model weight;
determining a second interframe distance based on the calculated value; and
updating the updateable interframe distance with the determined second interframe distance.

32. The method of claim 1 wherein the second video frame and the third video frame comprise a same video frame in the set of video frames.

33. The method of claim 1 wherein the second video frame and the third video frame comprise different video frames in the set of video frames.

34. A method comprising:
determining, by at least one processor, a first video frame from a set of video frames, the first video frame representing a first scene break;
in response to determining the first video frame:
updating, by at least one processor, a statistical predictor based at least in part on the first video frame; and
determining, by at least one processor, a second video frame from the set of video frames based at least in part on the updated statistical predictor, the second video frame representing a possible second scene break, the second video frame occurring a plurality of frames after the first video frame in the set of video frames, the second video frame being determined without analyzing a next video frame adjacent to the first video frame in the set of video frames; and
determining, by at least one processor, a third video frame from the set of video frames by analyzing at least the second video frame, the third video frame representing an actual second scene break, the third video frame occurring after the first video frame.

35. The method of claim 34, wherein the third video frame occurs after the second video frame in the set of video frames.

36. The method of claim 35, wherein the third video frame is determined without analyzing video frames occurring between the next video frame adjacent to the first video frame and the second video frame.

37. The method of claim 34, wherein the third video frame occurs between the first video frame and the second video frame in the set of video frames.

38. The method of claim 35, wherein the third video frame is determined by analyzing at least one video frame occurring between the next video frame adjacent to the first video frame and the second video frame, and wherein the third video frame is determined without analyzing video frames occurring after the second video frame.

* * * * *